United States Patent Office 3,377,284
Patented Apr. 9, 1968

---

3,377,284
SOLVENT-RESISTANT GREASES FOR HIGH
SPEED BEARINGS
Harry M. Schiefer and John S. Delphenich, Midland,
Mich., assignors to Dow Corning Corporation, Midland, Mich., a corporation of Michigan
No Drawing. Filed June 7, 1965, Ser. No. 462,101
7 Claims. (Cl. 252—49.6)

ABSTRACT OF THE DISCLOSURE

Thermally stable lubricant greases exhibiting superior high-speed bearing life and organic solvent-resistance consisting of (a) liquid fluorinated polysiloxane and (b) arylurea thickener. Illustrative example being mixture of (a)

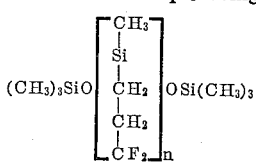

and (b)

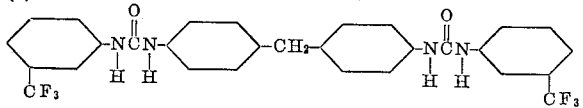

---

This application relates to new greases that combine the desirable properties of very great resistance to solvent-washing and sufficient mechanical stability to be operative in high-speed bearings.

The lubricant greases of this invention consist essentially of a lubricant grease consisting essentially of from 60 to 90 weight percent of (a) a liquid polysiloxane of the formula

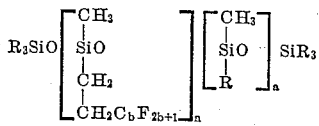

where R is selected from the group consisting of the methyl radical, —CH$_2$CH$_2$C$_b$F$_{2b+1}$ radicals, aryl radicals, alkaryl radicals, and haloaryl radicals where the halogen is of a lower atomic number than iodine, $b$ has an average value of 1 to 12, and $n$ and $a$ are numbers selected to yield a material having a viscosity at 25° C. of 75 to 30,000 cs., said liquid polysiloxane having at least a 30 weight percent fluorine content; thickened with from 10 to 40 weight percent of (b)

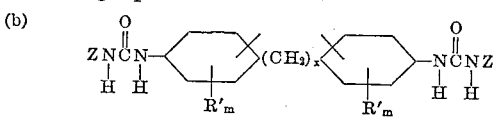

where R' is a lower alkyl radical, $x$ is 0 or 1, $m$ has a value of 0 to 2, and Z is a monovalent nitrophenyl radical, an α,α,α-trifluorotolyl radical, an aryl radical, an alkaryl radical, a haloaryl radical where the halogen is of a lower atomic number than iodine, or a cycloalkyl radical of at least 5 carbon atoms, the free valence of Z existing on a cyclic carbon atom, and at least one-eighth of the Z groups being nitrophenyl or α,α,α-trifluorotolyl.

The greases of this invention fall into the category known as aryl-substituted urea greases. This class of grease is disclosed in U.S. Patents 2,710,839; 2,710,840, and 2,710,841. None of the disclosed greases, however, possess both of the above excellent properties as do the greases of this invention.

R' can be any lower alkyl radical such as methyl, ethyl, or isopropyl.

R can be any of the classes mentioned above. Examples are aryl radicals such as phenyl or xenyl; alkaryl radicals such as tolyl, ethylphenyl or propylxenyl; and haloaryl radicals such as tetrafluorophenyl, chlorophenyl, and dibromophenyl. It is desirable for the R groups to be inert and not easily cleaved from their attached silicon atoms; any organic group that fulfills these criteria is operative.

Z can be any of the classses mentioned above, e.g. haloaryl as described above, and cycloalkyl such as cyclopentyl and cyclohexyl.

It is necessary for at least one-eighth of the Z groups to be nitrophenyl or α,α,α-trifluorotolyl

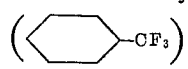

A significant difference in the resistance to solvent-washing of the grease occurs when even this small fraction of the Z groups is one of the above stated radicals.

It is often preferred, however, for at least two-fifths of the Z groups to be nitrophenyl or α,α,α-trifluorotolyl.

Ingredient (a), the organopolysiloxane ingredient, is well-known and commercially available in varying viscosities. The best solvent-resistance is obtained when ingradient (a) has a viscosity at 25° C. of over 500 cs. It is preferred for $b$ of ingredient (a) to be 1.

Ingredient (b) is a reaction product of isocyanates with primary amines. An isocyanate reacts spontaneously with a primary amine at room temperature, although moderate heating is often desirable in order to accelerate the reaction.

Ingredient (b) can be prepared in either of the following ways:

(1)

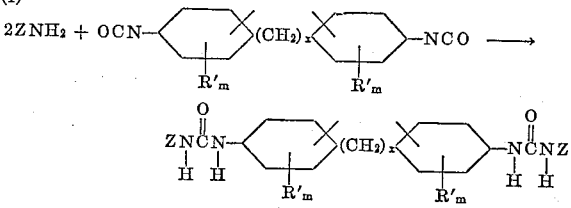

(2)

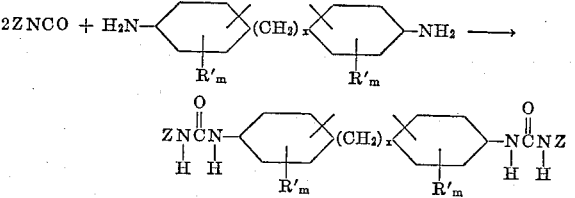

where the symbols are defined above.

Method (1) is generally preferred.

To prepare the grease of this invention, the reaction for preparing ingredient (b) should be performed in a manner that keeps ingredient (b) in a very finely divided state. This can be done by (1) running the reaction in the presence of at least sufficient volatile, inert solvent to make a slurry, examples of which solvent are benzene, toluene, diisobutylether, octane, ethylene glycol dimethyl-ether, methylethylketone, methylenedichloride, carbon tetrachloride, and propyldibromide; (2) running the reaction in the presence of ingredient (a); or (3) running the reaction in the presence of a volatile, inert solvent and ingredient (a); in each case with sufficient mixing to form a homogeneous material. The solvent can then be evaporated, leaving the grease of this invention behind.

It is preferred for at least one-half of the Z groups to be α,α,α-trifluorotolyl, and for the viscosity of ingredient (a) to be from 1000 to 2000 cs.

The greases of this invention are also useful as sealing compositions and rubber lubricants, exhibiting the same advantage of solvent-resistance. The compositions of this invention exhibit only small changes in physical consistency upon vigorous working; they are stable at high temperatures, having generally low bleed and evaporation rates; and they generally operate in the presence of liquified gases such as liquid oxygen. These materials give excellent results when they are used as lubricants for high-speed bearings and other uses involving a great amount of shearing action.

Other additives can be present in the compositions of this application without necessarily interfering with their improved properties. Examples are pentachlorophenyl-mercaptoacetic acid, $MoS_2$, corrosion inhibitors, and inorganic pigments in small quantities.

The following examples are illustrative only and should not be construed as limiting the invention, which is properly delineated in the appended claims.

Example 1

(a) To 70 parts by weight of a polymer of the formula

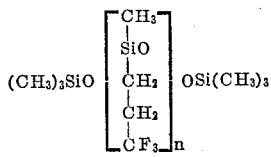

having a viscosity of 1460 cs. at 25° C., there was added 258 parts of 1,1,1-trichloroethane (Dow Chlorothene), 12.9 parts of

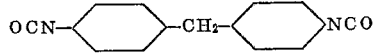

and 17.1 parts of meta-aminobenzotrifluoride

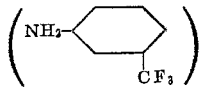

The mixture was heated at 125° C. and stirred until the reaction between the latter two ingredients was complete, forming

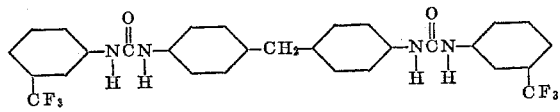

The 1,1,1-trichloroethane was removed by heating the mixture in a vacuum at 150° C.

The resulting product was a grease having excellent physical stability, and showing little change in consistency after vigorous working.

(b) A film of the grease was placed on an aluminum panel, and the panel was partly immersed in a mixture of 60 weight percent isooctane, 5 percent benzene, 20 percent toluene, and 15 percent xylene. The grease film remained intact on the panel for over 8 hours.

(c) The grease was used to lubricate a 204 size bearing which was operated continuously at 10,000 r.p.m., 400° F., and a 5 pound load. The bearing operated for 941 hours before failing.

The above bearing test was repeated, using a 197 pound load. The bearing had not failed after 675 hours of operation.

Example 2

To 83.4 parts by weight of a polymer of the formula

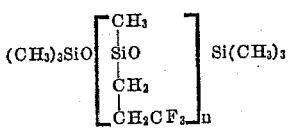

having a viscosity of 1460 cs. at 25° C., there was added 80.2 parts of 1,1,1-trichloroethane, 8.02 parts of

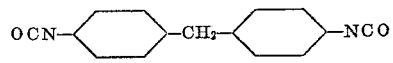

5.16 parts of meta-aminobenzotrifluoride, and 3.42 parts of paratoluidine. The mixture was heated at 125° C. and stirred until the reaction between the latter three ingredients was complete, yielding a compound of the average formula:

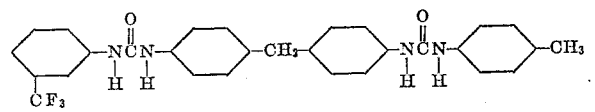

The 1,1,1-trichloroethane was then removed by heating the composition at 150° C. in a vacuum.

The resulting product was a grease having excellent physical stability, and showing little change in consistency after vigorous working.

A film of the grease was placed on a steel panel and partly immersed in the solvent mixture of Example 1. The grease film remained intact on the panel for over 8 hours.

The grease was subjected to the bearing test of Example 1 at a 197 pound load. The bearing operated in excess of 1082 hours.

Example 3

To 68.1 parts by weight of a polymer of the formula

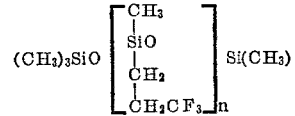

having a viscosity of 95 cs. at 25° C., there was added 137 parts of 1,1,1-trichloroethane, 13.7 parts of

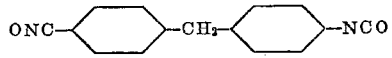

and 18.2 parts of meta-aminobenzotrifluoride. This was stirred and heated at 125° C. until the reaction of the latter two ingredients was complete. Then the mixture was heated in a vacuum at 150° C. to remove the 1,1,1-trichloroethane.

The product was a grease having good mechanical and physical stability. The grease was tested for solvent resistance in the manner of Example 1(b) using a kerosene-type jet fuel. The grease remained on the panel for over 8 hours.

The products gives good performance when used in a bearing.

Example 4

A mixture was prepared containing 78.5 parts by weight of a polymer of the formula

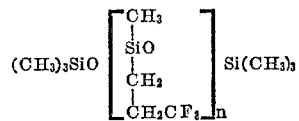

having a viscosity of 1000 cs. at 25° C., about 100 parts of 1,1,1-trichloroethane, 10.8 parts of

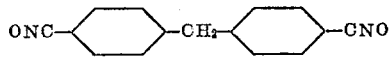

5.5 parts of p-nitroaniline, and 5.2 parts of p-toluidine. After reaction of the latter three ingredients was complete, yielding a composition of the average formula

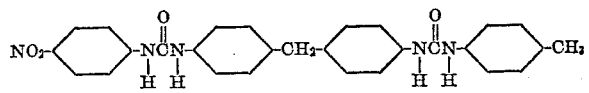

the mixture was heated at 150° C. in a vacuum to remove the 1,1,1-trichloroethane.

The product was a grease having good physical stability in the presence of mechanical working.

Upon subject to the solvent-resistance test of Example 1(b), the grease remained on the panel for more than 8 hours.

The grease gives good performance when used in a bearing.

Example 5

A mixture of 39.4 g. of a silicone polymer of the formula

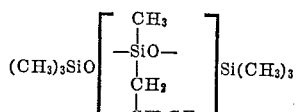

having a viscosity of 2000 cs. at 25° C., and 11.28 g. of

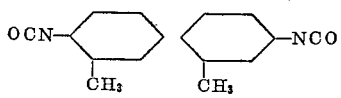

was heated at 177° C. until a uniform dispersion resulted.

This was cooled to 110° C. and mixed with a mixture consisting of 39.4 g. of the above silicone polymer, 6.27 g. of p-nitroaniline, and 4.54 g. of p-toluidine. This was thoroughly mixed, and then heated at 450° F. for 2 hours.

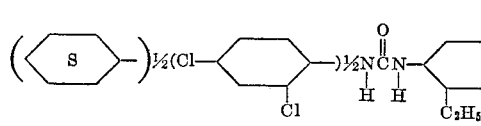

The product was a grease that exhibited no measurable change in consistency upon vigorous mechanical working. The thickener had the average formula:

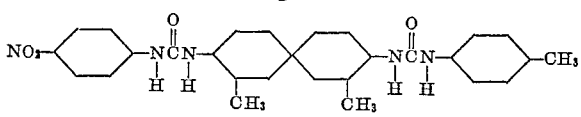

The grease was subjected to the test of Example 1(b).

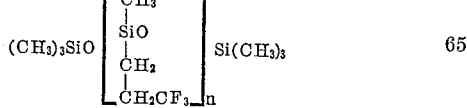

It remained on the panel for more than 8 hours. The grease was tested in a bearing in the manner of Example 1(c), using a load of 5 pounds. The bearing did not fail in 521 hours of continuous operation.

Example 6

A mixture of 46.5 g. of a silicone polymer of the formula

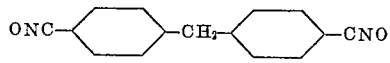

having a viscosity of 625 cs., 100 g. of $CH_2Cl_2$, 3.93 g. of fluoroaniline, and 5.22 g. of nitroaniline was added with stirring to a mixture of 8.2 g. of

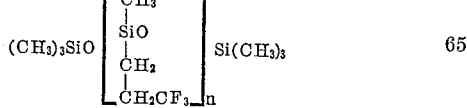

and 100 cc. of $CH_2Cl_2$. The mixture was allowed to stand for a few hours until the reaction of the latter three ingredients went to completion, yielding a composition of the average formula

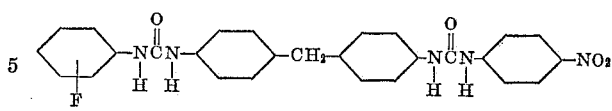

The mixture was then heated in a vacuum at 150° C. to remove the $CH_2Cl_2$, yielding a grease having good physical stability in the presence of mechanical working.

Upon subjection to the solvent-resistance test of Example 1(b), the grease remained on the panel for more than 8 hours.

Example 7

When a 10 g. of a silicone polymer of the formula

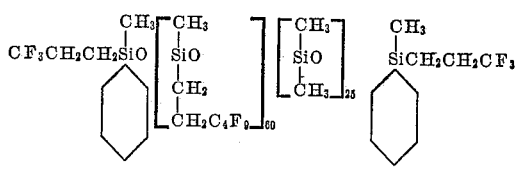

is mixed with 1.2 g. of a composition of the average formula

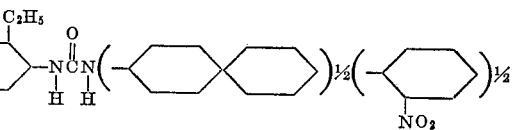

in a toluene dispersion, evaporation of the toluene yields a stable grease that exhibits resistance against washing by organic solvents, and which gives good performance as a bearing lubricant.

Example 8

When 10 g. of a silicone polymer of the formula

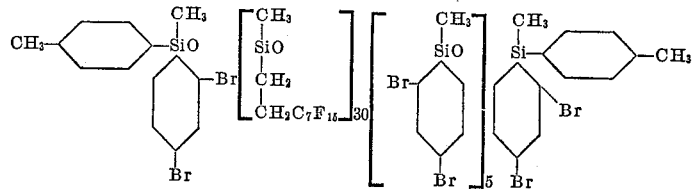

is mixed with 3.5 g. of

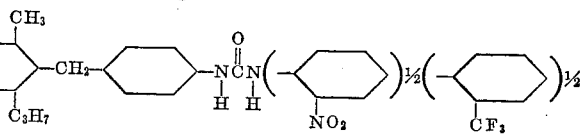

in a dipropylether dispersion, evaporation of the ether yields a stable grease that exhibits resistance against washing by organic solvents, and which gives good performance as a bearing lubricant.

That which is claimed is:

1. A lubricant grease consisting essentially of from 60 to 90 weight percent of (a) a liquid polysiloxane of the formula

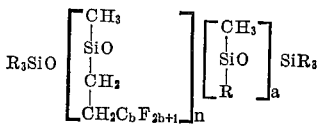

Where R is selected from the group consisting of the methyl radical, $-CH_2CH_2C_bF_{2b+1}$ radicals, aryl radicals, alkaryl radicals, and haloaryl radicals where the halogen is of a lower atomic number than iodine, $b$ has an average value of 1 to 12, and $n$ and $a$ are numbers selected to yield a material having a viscosity at 25° C. of 75 to 30,000 cs., said liquid polysiloxane having at least a 30 weight percent fluorine content; thickened with from 10 to 40 weight percent of (b)

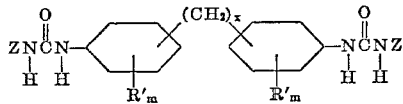

where R' is a lower alkyl radical, $x$ is 0 or 1, $m$ has a value of 0 to 2, and Z is a monovalent nitrophenyl radical, an α,α,α-trifluorotolyl radical, an aryl radical, an alkaryl radical, a haloaryl radical, where the halogen is of a lower atomic number than iodine, or a cycloalkyl radical of at least 5 carbon atoms, the free valence being attached to a cyclic carbon atom, and at least one-eighth of said Z groups being nitrophenyl or α,α,α-trifluorotolyl.

2. The grease of claim 1 where Z is at least 40 mol percent α,α,α-trifluorotolyl.

3. The grease of claim 1 where (b) is

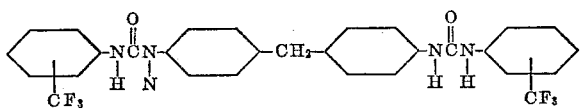

4. The grease of claim 1 where (b) is

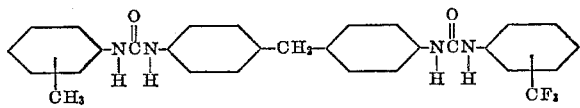

5. The grease of claim 1 where (b) is

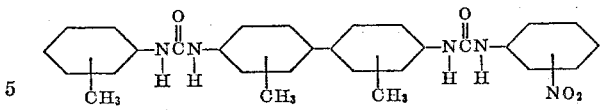

6. The grease of claim 1 wherein (a) is 0 and (b) is 1.

7. The grease of claim 1 where (a) is

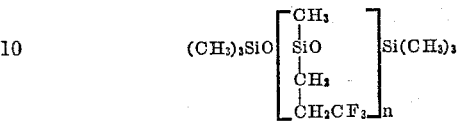

where $n$ is of such an average value as to yield a fluid having a viscosity of 500 to 2000 cs. at 25° C.

References Cited

UNITED STATES PATENTS

| | | | |
|---|---|---|---|
| 2,710,830 | 6/1955 | Swakon et al. | 252—51.5 |
| 2,710,840 | 6/1955 | Swakon et al. | 252—51.5 |
| 2,710,841 | 6/1955 | Swakon et al. | 252—51.5 |
| 2,832,739 | 4/1958 | Swakon | 252—51.5 |
| 2,890,170 | 6/1959 | Ragborg | 252—50 |
| 2,894,969 | 7/1959 | Pierce | 252—25 |
| 3,038,000 | 6/1962 | Schmidt | 252—49.6 |
| 3,061,545 | 10/1962 | Badger | 252—28 |
| 3,133,883 | 5/1964 | Hayne et al. | 252—51.5 |
| 3,148,883 | 9/1964 | Fassnacht | 252—49.6 |
| 3,251,774 | 5/1966 | Borg et al. | 252—51.5 |

OTHER REFERENCES

"Synthetic Lubricants," by Gunderson et al., Reinhold Pub. Corp., New York, 1962, pages 275, 277, 278, 283, 290, 303 and 317.

DANIEL E. WYMAN, *Primary Examiner.*

I. VAUGHN, *Assistant Examiner.*